US008034881B2

(12) United States Patent
Ikeda et al.

(10) Patent No.: US 8,034,881 B2
(45) Date of Patent: Oct. 11, 2011

(54) CROSS-LINKABLE NITRILE RUBBER COMPOSITION AND CROSS-LINKED RUBBER

(75) Inventors: Shinya Ikeda, Tokyo (JP); Hiroyasu Nagamori, Tokyo (JP); Peter J. Abraham, Vale of Glamorgan (GB)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 12/746,383

(22) PCT Filed: Jan. 30, 2009

(86) PCT No.: PCT/JP2009/051570
§ 371 (c)(1),
(2), (4) Date: Jun. 4, 2010

(87) PCT Pub. No.: WO2009/096518
PCT Pub. Date: Aug. 6, 2009

(65) Prior Publication Data
US 2010/0256294 A1      Oct. 7, 2010

(30) Foreign Application Priority Data

Jan. 31, 2008   (JP) ................................. 2008-020699

(51) Int. Cl.
*C08C 19/22*   (2006.01)
*C08F 8/32*    (2006.01)

(52) U.S. Cl. ...................... 525/375; 525/329.1; 525/379; 525/374

(58) Field of Classification Search ............... 525/329.7, 525/393, 381, 382, 329.1, 379, 375, 374
See application file for complete search history.

(56) References Cited

U.S. PATENT DOCUMENTS

| 5,639,528 A | 6/1997 | Feit et al. | |
| 6,657,014 B1 * | 12/2003 | Mori et al. | 525/329.3 |
| 2007/0231522 A1 | 10/2007 | Sakazaki et al. | |

FOREIGN PATENT DOCUMENTS

| JP | 4-338533 A | | 11/1992 |
| JP | 8-296772 A | | 11/1996 |
| JP | 2001-55471 A | | 2/2001 |
| JP | 2007-261079 | * | 10/2007 |
| JP | 2007-261079 A | | 10/2007 |
| WO | WO 2007/049651 A1 | | 5/2007 |

* cited by examiner

*Primary Examiner* — Ling Choi
(74) *Attorney, Agent, or Firm* — Birch, Stewart, Kolasch & Birch, LLP

(57) ABSTRACT

A cross-linkable nitrile rubber composition containing a highly saturated nitrile rubber (a) having an α,β-ethylenically unsaturated nitrile monomer unit and a carboxyl-group containing monomer unit and having an iodine value of 120 or less, a cross-linking agent (b), and a specific cyclic amidine and/or cyclic amidinium salt (c) is provided. Preferably, the cross-linking agent (b) is a polyamine-based cross-linking agent (d), and more preferably, the carboxyl-group containing monomer unit is an α,β-ethylenically unsaturated dicarboxylic acid monoester monomer unit.

9 Claims, No Drawings

CROSS-LINKABLE NITRILE RUBBER COMPOSITION AND CROSS-LINKED RUBBER

TECHNICAL FIELD

The present invention relates to a cross-linkable nitrile rubber composition giving cross-linked rubber with a small compression set and an excellent heat resistance.

BACKGROUND ART

In the past, as rubber with an excellent oil resistance, heat resistance, and ozone resistance, a nitrile-group containing highly saturated copolymer rubber (also called "highly saturated nitrile rubber", hydrogenated nitrile rubber included) has been known. Its cross-linked rubber is being used as materials for belts, hoses, gaskets, packings, oil seals, and various other automotive use rubber products. However, due to the increasingly smaller size and higher output of automobile engines, rubber materials more superior in heat resistance have become sought. Further, when using highly saturated nitrile rubber for seal applications, further reduction in compression set becomes necessary.

In the face of these circumstances, Patent Document 1 proposes a cross-linkable rubber composition containing highly saturated nitrile rubber having α,β-ethylenically unsaturated dicarboxylic acid monoester monomer units, a polyamine-based cross-linking agent and basic cross-linking accelerator. While this composition gives cross-linked rubber improved in heat resistance and compression set to a certain extent, further improvement of the compression set while maintaining the heat resistance in a good state has been sought.

Patent Document 1: Japanese Patent Publication (A) No. 2001-55471

DISCLOSURE OF INVENTION

Problem to be Solved by the Invention

An object of the present invention is to provide a cross-linkable nitrile rubber composition giving a cross-linked rubber with a good heat resistance (heat aging resistance) and an excellent compression set and cross-linked rubber of the same.

Means for Solving the Problems

The inventors engaged in intensive research to solve the above problem and as a result discovered that by blending into a specific highly saturated nitrile rubber a cross-linking agent and a specific amidine or amidinium salt and cross-linking the mixture, the above object can be achieved and thereby completed the present invention.

Therefore, according to the present invention, there are provided:

(1) A cross-linkable nitrile rubber composition containing a highly saturated nitrile rubber (a) having an α,β-ethylenically unsaturated nitrile monomer unit and a carboxyl-group containing monomer unit and having an iodine value of 120 or less, a cross-linking agent (b), and a cyclic amidine and/or cyclic amidinium salt (c) of the following formula (1):

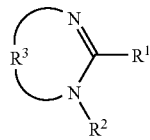

Formula (1)

(wherein, $R^1$ and $R^2$ independently indicate a hydrogen atom, an alkoxy group, an alkyl group which may have a substituent, alkenyl group which may have a substituent, or aryl group which may have a substituent, $R^1$ and $R^2$ may bond to form a cyclic structure, and, further, $R^3$ indicates an alkylene group or alkenylene group which may have a substituent.);

(2) The cross-linkable nitrile rubber composition as set forth above wherein the above cross-linking agent (b) is a polyamine-based cross-linking agent (d);

(3) The cross-linkable nitrile rubber composition as set forth above wherein the above carboxyl-group containing monomer unit is an α,β-ethylenically unsaturated dicarboxylic acid monoester monomer unit;

(4) The cross-linkable nitrile rubber composition as set forth above wherein the above cyclic amidine and/or cyclic amidinium salt (c) has a polycyclic structure;

(5) The cross-linkable nitrile rubber composition as set forth above wherein the above cyclic amidine and/or cyclic amidinium salt (c) is 1,8-diazabicyclo[5,4,0]undecene-7 or its salt;

(6) The cross-linkable nitrile rubber composition as set forth above wherein a ratio of content of the above cross-linking agent (b) is 0.1 to 20 parts by weight with respect to 100 parts by weight of the above highly saturated nitrile rubber (a);

(7) The cross-linkable nitrile rubber composition as set forth above wherein a ratio of content of the above cyclic amidine and/or cyclic amidinium salt (c) is 0.1 to 20 parts by weight with respect to 100 parts by weight of the above highly saturated nitrile rubber (a);

(8) The cross-linkable nitrile rubber composition as set forth above further containing carbon black and/or silica;

(9) A cross-linked rubber obtained by cross-linking the cross-linkable nitrile rubber composition as set forth above; and

(10) The cross-linked rubber as set forth above which is a belt or seal material.

Effects of the Invention

According to the present invention, there is provided a cross-linkable nitrile rubber composition giving a cross-linked rubber with a good heat resistance (heat aging resistance) and an excellent compression set.

BEST MODE FOR CARRYING OUT THE INVENTION

Cross-Linkable Nitrile Rubber Composition

The cross-linkable nitrile rubber composition of the present invention is one containing a highly saturated nitrile rubber (a) having an α,β-ethylenically unsaturated nitrile monomer unit and a carboxyl-group containing monomer unit and having an iodine value of 120 or less, a cross-linking agent (b), and a cyclic amidine and/or cyclic amidinium salt (c) expressed by the formula (1).

Highly Saturated Nitrile Rubber (a)

The monomer forming the α,β-ethylenically unsaturated nitrile monomer unit of the highly saturated nitrile rubber (a) (below, sometimes referred to as an "α,β-ethylenically unsaturated nitrile") is not limited so long as an α,β-ethylenically unsaturated compound having a nitrile group. An acrylonitrile; α-chloroacrylonitrile, α-bromoacrylonitrile, or other α-halogenoacrylonitriles; a methacrylonitrile, or other α-alkyl acrylonitriles etc. may be mentioned. An acrylonitrile and methacrylonitrile are preferable. The α,β-ethylenically unsaturated nitrile may be used in combination.

The content of the α,β-ethylenically unsaturated nitrile monomer unit in the highly saturated nitrile rubber (a) is preferably 10 to 60 wt %, more preferably 15 to 55 wt %, particularly preferably 20 to 50 wt %. If the content of the α,β-ethylenically unsaturated nitrile monomer unit is too small, the cross-linked rubber is liable to drop in oil resistance, while conversely if too large, the cold resistance may drop.

The carboxyl-group containing monomer unit of the highly saturated nitrile rubber (a) is a unit of a monomer having at least one free carboxyl group (carboxyl group not substituted by a metal salt etc.) or its anhydride bond. By including such a carboxyl-group containing monomer unit, the obtained cross-linked rubber can be made one with excellent tensile stress.

As the monomer forming the carboxyl-group containing monomer unit, an α,β-ethylenically unsaturated monocarboxylic acid, α,β-ethylenically unsaturated dicarboxylic acid monoester, α,β-ethylenically unsaturated polyvalent carboxylic acid, or an anhydride of the same is preferable. Since the effect of the present invention becomes much more remarkable, an α,β-ethylenically unsaturated dicarboxylic acid monoester is particularly preferable.

As the organic group bonding with the carbonyl group through an oxygen atom at the ester part of the α,β-ethylenically unsaturated dicarboxylic acid monoester, an alkyl group, cycloalkyl group, or alkyl cycloalkyl group is preferable, while an alkyl group is particularly preferable. The alkyl group preferably has 1 to 10 carbon atoms, more preferably 2 to 6 carbon atoms, the cycloalkyl group preferably has 5 to 12 carbon atoms, more preferably 6 to 10 carbon atoms, and the alkyl cycloalkyl group preferably has 6 to 12 carbon atoms, more preferably 7 to 10 carbon atoms. If the number of carbon atoms of the organic group is too small, the cross-linkable nitrile rubber composition is liable to drop in working stability, while conversely if the number of carbon atoms is too large, the cross-linking speed may become lower or the cross-linked rubber may drop in mechanical properties.

As examples of the α,β-ethylenically unsaturated dicarboxylic acid monoester, monomethyl maleate, monoethyl maleate, monopropyl maleate, mono-n-butyl maleate, and other maleic acid monoalkyl esters; monocyclopentyl maleate, monocyclohexyl maleate, monocycloheptyl maleate, and other maleic acid monocycloalkyl esters; monomethylcyclopentyl maleate, monoethylcyclohexyl maleate, and other maleic acid monoalkyl cycloalkyl esters; monomethyl fumarate, monoethyl fumarate, monopropyl fumarate, mono-n-butyl fumarate, and other fumaric acid monoalkyl esters; monocyclopentyl fumarate, monocyclohexyl fumarate, monocycloheptyl fumarate, and other fumaric acid monocycloalkyl esters; monomethylcyclopentyl fumarate, monoethylcyclohexyl fumarate, and other fumaric acid monoalkyl cycloalkyl esters; monomethyl citraconate, monoethyl citraconate, monopropyl citraconate, mono-n-butyl citraconate, and other citraconic acid monoalkyl esters; monocyclopentyl citraconate, monocyclohexyl citraconate, monocycloheptyl citraconate, and other citraconic acid monocycloalkyl esters; monomethylcyclopentyl citraconate, monoethylcyclohexyl citraconate, and other citraconic acid monoalkyl cycloalkyl esters; monomethyl itaconate, monoethyl itaconate, monopropyl itaconate, mono-n-butyl itaconate, and other itaconic acid monoalkyl esters; monocyclopentyl itaconate, monocyclohexyl itaconate, monocycloheptyl itaconate, and other itaconic acid monocycloalkyl esters; monomethylcyclopentyl itaconate, monoethylcyclohexyl itaconate, and other itaconic acid monoalkyl cycloalkyl esters; etc. may be mentioned.

Among these as well, from the viewpoint of the effect of the present invention appearing much more remarkably, monopropyl maleate, mono-n-butyl maleate, monopropyl fumarate, mono-n-butyl fumarate, monopropyl citraconate, mono-n-butyl citraconate, and other monoesters of dicarboxylic acids having carboxyl groups at the two carbon atoms forming the α,β-ethylenically unsaturated bond are preferable, mono-n-butyl maleate, monopropyl citraconate, and other monoesters of dicarboxylic acids having two carboxyl groups at the cis positions (cis arrangement) are more preferable, and mono-n-butyl maleate is particularly preferable.

As the α,β-ethylenically unsaturated monocarboxylic acid, acrylic acid, methacrylic acid, crotonic acid, etc. may be mentioned.

As the α,β-ethylenically unsaturated polyvalent carboxylic acid, itaconic acid, fumaric acid, maleic acid, etc. may be mentioned.

As the α,β-ethylenically unsaturated polyvalent carboxylic acid anhydride, maleic acid anhydride etc. may be mentioned.

The content of the carboxyl-group containing monomer unit in the highly saturated nitrile rubber (a) is preferably 0.1 to 20 wt %, more preferably 0.2 to 15 wt %, particularly preferably 0.5 to 10 wt %. If the content of the monomer unit having a carboxyl group is too small, the tensile stress of the cross-linked rubber is liable to fall, while conversely if too large, the cross-linkable nitrile rubber composition may deteriorate in scorch stability or the cross-linked rubber may drop in fatigue resistance.

The highly saturated nitrile rubber (a) has, in addition to the α,β-ethylenically unsaturated nitrile monomer unit and carboxyl-group containing monomer unit, usually, a diene monomer unit and/or α-olefin monomer unit so that the cross-linked rubber has rubber elasticity.

As examples of the diene monomer forming the diene monomer unit, 1,3-butadiene, isoprene, 2,3-dimethyl-1,3-butadiene, 1,3-pentadiene, and other $C_4$ or higher conjugated diene monomers; 1,4-pentadiene, 1,4-hexadiene, and other preferably $C_5$ to $C_{12}$ nonconjugated diene monomers; may be mentioned. Among these, a conjugated diene monomer is preferable, and 1,3-butadiene is more preferable.

The α-olefin monomer forming the α-olefin monomer unit is preferably a $C_2$ to $C_{12}$ one. Ethylene, propylene, 1-butene, 4-methyl-1-pentene, 1-hexene, 1-octene, etc. may be mentioned.

The content of the diene monomer unit and/or α-olefin monomer unit in the highly saturated nitrile rubber (a) is preferably 20 to 89.9 wt %, more preferably 30 to 84.8 wt %, particularly preferably 40 to 79.5 wt %. If the content is too small, the cross-linked rubber is liable to drop in rubber elasticity, while conversely if too large, the heat resistance and the chemical resistance stability may be impaired.

The highly saturated nitrile rubber (a) can further contain a unit of other monomer able to copolymerize with the α,β-ethylenically unsaturated nitrile monomer, carboxyl-group containing monomer, and diene monomer and/or α-olefin monomer. As such other monomer, an α,β-ethylenically unsaturated carboxylic acid ester monomer other than an α,β-ethylenically unsaturated dicarboxylic acid monoester monomer, an aromatic vinyl monomer, a fluorine-containing vinyl monomer, a copolymerizable antiaging agent, etc. may be mentioned.

As the α,β-ethylenically unsaturated carboxylic acid ester monomer other than an α,β-ethylenically unsaturated dicarboxylic acid monoester monomer, for example, methyl acrylate, ethyl acrylate, propyl acrylate, n-butyl acrylate, n-pentyl acrylate, 2-ethylhexyl acrylate, ethyl methacrylate, propyl methacrylate, and other (meth)acrylic acid alkyl ester [meaning acrylic acid alkyl esters and methacrylic alkyl esters, same below] monomers with $C_1$ to $C_{18}$ alkyl group; methoxymethyl acrylate, ethoxymethyl methacrylate, and other (meth)acrylic acid alkoxyalkyl ester monomers with $C_1$ to $C_{18}$ alkoxyalkyl group having $C_1$ to $C_{12}$ alkoxy group; 2-aminoethyl acrylate, aminomethyl methacrylate, and other amino-group containing (meth)acrylic acid alkyl ester monomers with $C_1$ to $C_{16}$ alkyl group; 2-hydroxyethyl acrylate, 3-hydroxypropyl methacrylate, and other (meth)acrylic acid hydroxyalkyl ester monomers with $C_1$ to $C_{16}$ alkyl group; trifluoroethyl acrylate, difluoromethyl methacrylate, and other fluoroalkyl-group containing (meth)acrylic acid alkyl ester monomers with $C_1$ to $C_{16}$ alkyl group;

dimethyl maleate, di-n-butyl maleate, and other maleic acid dialkyl esters with $C_1$ to $C_{18}$ alkyl group; dimethyl fumarate, di-n-butyl fumarate, and other fumaric acid dialkyl esters with $C_1$ to $C_{18}$ alkyl group; dicyclopentyl maleate, dicyclohexyl maleate, and other maleic acid dicycloalkyl esters with $C_4$ to $C_{16}$ cycloalkyl group; dicyclopentyl fumarate, dicyclohexyl fumarate, and other fumaric acid dicycloalkyl esters with $C_4$ to $C_{16}$ cycloalkyl group; dimethyl itaconate, di-n-butyl itaconate, and other itaconic acid dialkyl esters with $C_1$ to $C_{18}$ alkyl group; dicyclohexyl itaconate and other itaconic acid dicycloalkyl esters with $C_4$ to $C_{16}$ cycloalkyl group; etc. may be mentioned.

As the aromatic vinyl monomer, styrene, α-methylstyrene, vinyl pyridine, etc. may be mentioned.

As the fluorine-containing vinyl monomer, fluoroethylvinyl ether, fluoropropyl vinyl ether, o-trifluoromethylstyrene, vinyl pentafluorobenzoate, difluoroethylene, tetrafluoroethylene, etc. may be mentioned.

As the copolymerizable antiaging agent, N-(4-anilinophenyl)acrylamide, N-(4-anilinophenyl)methacrylamide, N-(4-anilinophenyl)cinnamide, N-(4-anilinophenyl)crotonamide, N-phenyl-4-(3-vinyl benzyloxy)aniline, N-phenyl-4-(4-vinylbenzyloxy)aniline, etc. may be mentioned.

These other copolymerizable monomers may also be used in combination. The content of the other monomer units of the highly saturated nitrile rubber (a) is preferably 50 wt % or less, more preferably 40 wt % or less, particularly preferably 10 wt % or less.

The content of the carboxyl groups in the highly saturated nitrile rubber (a) used in the present invention, that is, the number of moles of the carboxyl group per 100 g of the highly saturated nitrile rubber (a), is preferably $5 \times 10^{-4}$ to $5 \times 10^{-1}$ ephr, more preferably $1 \times 10^{-3}$ to $1 \times 10^{-1}$ ephr, particularly preferably $5 \times 10^{-3}$ to $6 \times 10^{-2}$ ephr. If the content of the carboxyl group of the highly saturated nitrile rubber (a) is too small, the cross-linkable nitrile rubber composition will not sufficiently cross-link and the cross-linked rubber is liable to fall in tensile stress, while conversely if too large, the cross-linkable nitrile rubber composition may deteriorate in scorch stability or the cross-linked rubber may fall in fatigue resistance.

The highly saturated nitrile rubber (a) is one with an iodine value of 120 or less, preferably 80 or less, more preferably 25 or less, particularly preferably 15 or less. If the highly saturated nitrile rubber (a) is too high in iodine value, the cross-linked rubber is liable to fall in ozone resistance.

Further, the highly saturated nitrile rubber (a) has a polymer Mooney viscosity ($ML_{1+4}$, 100° C.) of preferably 15 to 200, more preferably 20 to 150, particularly preferably 30 to 120. If the highly saturated nitrile rubber (a) is too low in Mooney viscosity, the cross-linked rubber is liable to drop in strength characteristics, while conversely if too high, the cross-linkable nitrile rubber composition may drop in workability.

The method of production of the highly saturated nitrile rubber (a) is not particularly limited. In general, the method of copolymerization of an α,β-ethylenically unsaturated nitrile monomer, a carboxyl-group containing monomer, a diene monomer, and/or an α-olefin monomer, and other copolymerizable monomers added in accordance with need is convenient and preferable. As the polymerization method, any of the known emulsion polymerization method, suspension polymerization method, bulk polymerization method, and solution polymerization method may be used, but due to the ease of control of the polymerization reaction, the emulsion polymerization method is preferable.

If the copolymer obtained by copolymerization has an iodine value higher than 120, the copolymer may be hydrogenated. The method of hydrogenation is not particularly limited. A known method may be employed.

Further, to introduce a carboxyl-group containing monomer unit in the highly saturated nitrile rubber (a), it is also possible to employ the method of production of polymerization of the highly saturated nitrile rubber, then addition of a compound having an alkoxycarbonyl group, carboxyl group, or acid anhydride group to the polymer and hydrolyzing the result in accordance with need. As the compound having the alkoxycarbonyl group, carboxyl group, or acid anhydride group in this case, an α,β-ethylenically unsaturated monocarboxylic acid, α,β-ethylenically unsaturated polyvalent carboxylic acid, or their anhydrides, an α,β-ethylenically unsaturated carboxylic acid ester other than the above α,β-ethylenically unsaturated dicarboxylic acid monoester monomer, etc. may be mentioned.

Cross-linking Agent (b)

The cross-linkable nitrile rubber composition of the present invention contains a cross-linking agent (b).

The cross-linking agent (b) is not particularly limited so long as able to cross-link the highly saturated nitrile rubber (a). A sulfur-based cross-linking agent, organic peroxide, polyamine-based cross-linking agent (d), etc. may be mentioned, but since the effect of the present invention becomes much more remarkable, a polyamine-based cross-linking agent (d) is preferable.

As the sulfur-based cross-linking agent, powdered sulfur, precipitated sulfur, and other sulfur; 4,4'-dithiomorpholin or tetramethyl thiuram disulfide, tetraethyl thiuram disulfide, polymer polysulfide, or other organic sulfur compounds; etc. may be mentioned.

As the organic peroxide, dialkyl peroxides, diacyl peroxides, peroxy esters, etc. may be mentioned. As the dialkyl peroxides, dicumyl peroxide, di-t-butyl peroxide, 2,5-dimethyl-2,5-di(t-butylperoxy)-3-hexine, 2,5-dimethyl-2,5-di(t-butylperoxy)hexane, 1,3-bi(t-butylperoxyisopropyl)benzene, etc. may be mentioned. As diacyl peroxides, benzoyl peroxide, isobutyryl peroxide, etc. may be mentioned. As peroxy esters, 2,5-dimethyl-2,5-bis(benzolyperoxy)hexane, t-butylperoxyisopropyl carbonate, etc. may be mentioned.

The polyamine-based cross-linking agent (d) is not particularly limited so long as a compound having two or more amino groups or one becoming a compound having two or more amino groups at the time of cross-linking, but an aliphatic hydrocarbon or an aromatic hydrocarbon with a plurality of hydrogen atoms substituted by an amino group or hydrazide structure (structure expressed by —CONHNH$_2$, where CO indicates a carbonyl group) is preferable. As specific examples, hexamethylene diamine, hexamethylene diamine carbamate, tetramethylene pentamine, hexamethylene diamine cinnamaldehyde adduct, hexamethylene diamine dibenzoates, and other aliphatic polyvalent amines; 2,2-bis{4-(4-aminophenoxy)phenyl}propane, 4,4'-methylene dianiline, m-phenylene diamine, p-phenylene diamine, 4,4'-methylene bis(o-chloroaniline), and other aromatic polyvalent amines; dihydrazide isophthalate, dihydrazide adipate, dihydrazide sebacate, and other compounds having two or more hydrazide structures; etc. may be mentioned, but hexamethylene diamine carbamate is particularly preferable.

The content of the cross-linking agent (b) in the cross-linkable nitrile rubber composition of the present invention is, with respect to the highly saturated nitrile rubber (a) as 100 parts by weight, preferably 0.1 to 20 parts by weight, more preferably 0.2 to 15 parts by weight, particularly preferably 0.5 to 10 parts by weight. If the content of the cross-linking agent (b) is too small, a cross-linked rubber with excellent heat resistance and small compression set is liable not to be obtainable, while if too large, the cross-linked rubber may fall in fatigue resistance.

Cyclic Amidine and/or Cyclic Amidinium Ion Salt (c)

The cross-linkable nitrile rubber composition of the present invention is comprised of the highly saturated nitrile rubber (a), cross-linking agent (b) in which cyclic amidine and/or cyclic amidinium ion salt (c) expressed by the following formula (1) is contained.

[Chemical Formula 2]

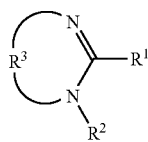

Formula (1)

(wherein, $R^1$ and $R^2$ independently indicate a hydrogen atom, an alkoxy group, an alkyl group which may have a substituent, alkenyl group which may have a substituent, or aryl group which may have a substituent, $R^1$ and $R^2$ may bond to form a cyclic structure, and, further, $R^3$ indicates an alkylene group or alkenylene group which may have a substituent.)

As the alkoxy group, a methoxy group, ethoxy group, or other $C_1$ to $C_5$ alkoxy group may be mentioned.

In the alkyl group which may have a substituent, as the substituent, a halogen atom, hydroxy group, carboxyl group, alkoxy group, carbonyl group, amino group, alkoxycarbonyloxy group, nitro group, or aryl group may be mentioned. Further, the alkyl group preferably has 1 to 5 carbon atoms.

In the alkenyl group which may have a substituent, as the substituent, a halogen atom, hydroxy group, alkoxy group, carbonyl group, amino group, alkoxycarbonyloxy group, nitro group, or aryl group may be mentioned. Further, the alkenyl group preferably has 1 to 5 carbon atoms.

In the aryl group which may have a substituent, as the substituent, a halogen atom, hydroxy group, alkoxy group, carbonyl group, amino group, alkoxycarbonyloxy group, nitro group, or aryl group may be mentioned. Further, the aryl group preferably has 6 to 12 carbon atoms.

Further, since the effect of the present invention becomes much more remarkable, $R^1$ and $R^2$ bonding to form a cyclic structure (that is, the "cyclic amidine and/or cyclic amidinium ion salt (c)" having a polycyclic structure) is preferable. Further, when the $R^1$ and $R^2$ bond to form a cyclic structure, the cyclic structure may also have a carbon-carbon unsaturated bond. Further, part of the carbon framework forming the cyclic structure may be substituted by a nitrogen atom, but $R^1$ and $R^2$ bonding and their bonding to form a $C_3$ to $C_8$ alkylene group which may have a substituent is preferable. Note that the alkylene group in the alkylene group which may have a substituent has 3 to 8 carbon atoms, preferably 3 to 5, particularly preferably 5. Further, as the substituent, a substituent similar to the above-mentioned alkyl group which may have a substituent may be mentioned. Note that since the effect of the present invention becomes much more remarkable, the alkylene group which the $R^1$ and $R^2$ bond to form is more preferably an unsubstituted polymethylene group.

Furthermore, as $R^3$, a $C_3$ to $C_8$ alkylene group or $C_3$ to $C_8$ alkenylene group which may have a substituent is preferable, a $C_3$ to $C_5$ alkylene group which may have a substituent is more preferable, and a $C_3$ alkylene group which may have a substituent is particularly preferable. As the substituent in the alkylene group or alkenylene group which may have a substituent, an alkyl group, halogen atom, hydroxy group, alkoxy group, carbonyl group, amino group, alkoxycarbonyloxy group, nitro group, or aryl group may be mentioned. Further, the alkylene group or alkenylene group of $R^3$ may also have a structure condensed with the benzene ring etc. However, as $R^3$, since the effect of the present invention becomes much more remarkable, a $C_3$ to $C_8$ nonsubstituted polymethylene group is preferable, a $C_3$ to $C_5$ nonsubstituted polymethylene group is more preferable, and a $C_3$ nonsubstituted polymethylene group is particularly preferable.

As the cyclic amidine compound shown by the above general formula (1), a compound having an imidazole ring, a compound having an imidazoline ring, a compound having a tetrahydropyrimidine ring, and a compound where $R^1$ and $R^2$ bond to form a cyclic structure (one having a polycyclic structure) are preferable, while a compound where $R^1$ and $R^2$ bond to form a cyclic structure is particularly preferable since the effect of the present invention becomes much more remarkable.

As the compound having an imidazole ring, 1-methylimidazole, 1-ethylimidazole, 1-phenylimidazole, 1-benzylimidazole, 1,2-dimethylimidazole, 1-ethyl-2-methylimidazole, 1-methoxyethylimidazole, 1-phenyl-2-methylimidazole, 1-benzyl-2-methylimidazole, 1-methyl-2-phenylimidazole, 1-methyl-2-benzylimidazole, 1,4-dimethylimidazole, 1,5-dimethylimidazole, 1,2,4-trimethylimidazole, 1,4-dimethyl-2-ethylimidazole, 1-methyl-2-methoxyimidazole, 1-methyl-2-ethoxyimidazole, 1-methyl-4-methoxyimidazole, 1-methyl-2-methoxyimidazole, 1-ethoxymethyl-2-methylimidazole, 1-methyl-4-nitroimidazole, 1,2-dimethyl-5-nitroimidazole, 1,2-dimethyl-5-aminoimidazole, 1-methyl-4-(2-aminoethyl)imidazole, 1-methylbenzoimidazole, 1-methyl-2-benzylbenzoimidazole, 1-methyl-5-nitrobenzoimidazole, etc. may be mentioned.

As a compound having an imidazoline ring, 1-methylimidazoline, 1,2-dimethylimidazoline, 1,2,4-trimethylimidazoline, 1,4-dimethyl-2-ethylimidazoline, 1-methyl-2-phenylimidazoline, 1-methyl-2-benzylimidazoline, 1-methyl-2-ethoxyimidazoline, 1-methyl-2-heptylimidazoline, 1-methyl-2-undecylimidazoline, 1-methyl-2-heptadecylimidazoline, 1-methyl-2-ethoxymethylimidazoline, 1-ethoxymethyl-2-methylimidazoline, etc. may be mentioned.

As a compound having a tetrahydropyrimidine ring, 1-methyl-1,4,5,6-tetrahydropyrimidine, 1,2-dimethyl-1,4,5,6-tetrahydropyrimidine, etc. may be mentioned.

The compound where $R^1$ and $R^2$ bond to form a cyclic structure is not particularly limited, but 1,8-diazabicyclo[5,4,0]undecene-7 (hereinafter sometimes abbreviated as "DBU") and 1,5-diazabicyclo[4,3,0]nonene-5 (hereinafter sometimes abbreviated as "DBN") are preferable, while 1,8-diazabicyclo[5,4,0]undecene-7 is particularly preferable.

The cyclic amidinium salt (c) used in the present invention is a salt of cyclic amidine (c) expressed by the formula (1). As the compound forming the salt, an organic carboxylic acid and alkyl phosphoric acid (including a zinc dialkyl diphosphate) is preferable, and an organic carboxylic acid is particularly preferable. As the organic carboxylic acid, saturated monocarboxylic acid, saturated polyvalent carboxylic acid, unsaturated monocarboxylic acid, unsaturated polyvalent carboxylic acid, a carboxylic acid having a cyclic structure, etc. may be mentioned. Note that the cyclic amidinium salt (c) can be obtained by using the cyclic amidine (c) expressed by the formula (1) and reacting the compound forming a salt in an amount of 0.5 to 2 moles with respect to 1 mole of the cyclic amidine (c) expressed by the formula (1).

As the saturated monocarboxylic acid, formic acid, acetic acid, propionic acid, butyric acid, isobutyric acid, valeric acid, isovaleric acid, pivalic acid, lactic acid, caproic acid, caprylic acid, capric acid, lauryl acid, myristic acid, stearic acid, etc. may be mentioned.

As the saturated polyvalent carboxylic acid, oxalic acid, malonic acid, succinic acid, adipic acid, citric acid, glutaric acid, pimelic acid, suberic acid, azelaic acid, sebacic acid, etc. may be mentioned.

As the unsaturated monocarboxylic acid, acrylic acid, methacrylic acid, crotonic acid, isocrotonic acid, etc. may be mentioned.

As the unsaturated polyvalent carboxylic acid, maleic acid, fumaric acid, oleic acid, itaconic acid, etc. may be mentioned.

As the carboxylic acid having the cyclic structure, benzoic acid, salicylic acid, hydroxybenzoic acid, nitrobenzoic acid, methoxybenzoic acid, phthalic acid, isophthalic acid, terephthalic acid, toluic acid, naphthoic acid, etc. may be mentioned.

Among these, a saturated monocarboxylic acid and saturated polyvalent carboxylic acid is preferable, a saturated monocarboxylic acid is more preferable, and formic acid is particularly preferable.

The cyclic amidine and/or cyclic amidinium ion salt (c) expressed by the formula (1) may be used formed into tablets by clay, talc, diatomaceous earth, etc. for the purpose of improving the precision of compounding and the handling when in a liquid state.

The lower limit of the total amount of the cyclic amidine and cyclic amidinium ion salt (c) expressed by the formula (1) with respect to the highly saturated nitrile rubber (a) as 100 parts by weight is preferably 0.1 part by weight, more preferably 0.3 part by weight, particularly preferably 0.5 part by weight, while the upper limit is preferably 20 parts by weight, more preferably 10 parts by weight, particularly preferably 5 parts by weight.

If the amount of the cyclic amidine and/or cyclic amidinium ion salt (c) expressed by the formula (1) is too small, the cross-linking speed becomes too slow and the cross-linking density falls in some cases, while if the amount is too great, the cross-linking speed becomes too fast and scorching occurs or the storage stability is impaired in some cases.

The cross-linkable nitrile rubber composition of the present invention preferably contains a reinforcing filler of carbon black and/or silica. The lower limit of the total amount of carbon black and silica with respect to the highly saturated nitrile rubber (a) as 100 parts by weight is preferably 0.1 part by weight, more preferably 0.5 part by weight, still more preferably 1 part by weight, particularly preferably 10 parts by weight, while the upper limit is preferably 300 parts by weight, more preferably 200 parts by weight, particularly preferably 120 parts by weight. If the total amount of the carbon black and silica is too small, the rubber sometimes falls in strength, while if the total amount is too large, the viscosity rises and the moldability is impaired in some cases.

The carbon black is not particularly limited, but is suitably one usually used for rubber formulations. For example, furnace black, acetylene black, thermal black, channel black, graphite, etc. may be used, but furnace black is preferable since the effect of the present invention becomes much more remarkable.

As preferable specific examples of furnace black, SAF, ISAF, ISAF-HS, ISAF-LS, IISAF-HS, HAF, HAF-HS, HAF-LS, MAF, FEF, FEF-LS, GPF, GPF-HS, GPF-LS, SRF, SRF-HS, SRF-LM, etc. may be mentioned.

Further, the particle size of the carbon black is preferably 15 to 200 nm, more preferably 18 to 100 nm, the nitrogen adsorption specific surface area is preferably 10 to 260 $m^2/g$, more preferably 20 to 240 $m^2/g$, and the DBP oil absorption is preferably 50 to 200 ml/100 g, more preferably 70 to 180 ml/100 g.

The silica is not particularly limited, but when expressed by a formula, a compound including ($SiO_2$) in the formula is preferable. Specifically, quartz powder, silica powder, and other natural silica; anhydrous silicic acid (silica gel, aerogel, etc.), hydrous silicic acid, and other synthetic silica; silicic acid metal salt etc. may be mentioned. Among these, synthetic silica or a silicic acid metal salt is preferable.

Note that the natural silica and synthetic silica is one having the formula expressed by ($SiO_2$) or ($SiO.nH_2O$). As the synthetic silica, use of anhydrous synthetic silica is preferable. The anhydrous synthetic silica is preferably one generally used as a filler of synthetic rubber called a "white filler" (white carbon).

The cross-linkable nitrile rubber composition of the present invention may include, in addition to the highly saturated nitrile rubber (a), cross-linking agent (b), and cyclic amidine and/or cyclic amidinium salt (c) expressed by the formula (1), compounding agents usually used in the rubber processing field, for example, a cross-linking accelerators other than a cyclic amidine and/or cyclic amidinium salt expressed by the formula (1), cross-linking aids, cross-linking retardants, non-reinforcing fillers (clay, talc, diatomaceous earth, etc.), antiaging agents, antioxidants, light stabilizers, primary amines and other scorch preventers, plasticizers, working aids, lubricants, adhesives, lubricating agents, flame retardants, anti-fungal agents, acid acceptors, antistatic agents, pigments, etc. The amounts of these compounding agents are not particularly limited if in a range not impairing the effect of the present invention. Amounts according to the objective may be suitably compounded.

Further, the cross-linkable nitrile rubber composition of the present invention may have blended into it rubber other than the highly saturated nitrile rubber (a) in a range not impairing the effects of the present invention. When blending in a rubber other than the highly saturated nitrile rubber (a), 30 parts by weight or less with respect to the highly saturated nitrile rubber (a) as 100 parts by weight is preferable, 20 parts by weight or less is more preferable, and 10 parts by weight or less is particularly preferable.

The cross-linkable nitrile rubber composition of the present invention is prepared by mixing the above ingredients in preferably a non-aqueous system. The method of preparing the cross-linkable nitrile rubber composition of the present invention is not limited, but usually the ingredients other than the cross-linking agent (b) and the cyclic amidine and/or cyclic amidinium salt (c) expressed by the above formula (1) and compounding agents unstable with respect to heat are kneaded by a Bambury mixer, intermixer, kneader, or other mixer on a primary basis, then are transferred to a roll etc. where the cross-linking agent (b), the cyclic amidine and/or cyclic amidinium salt (c) expressed by the above formula (1), etc. are kneaded on a secondary basis.

The cross-linkable nitrile rubber composition of the present invention has a moisture content of preferably 3 wt % or less, more preferably 1 wt % or less.

The cross-linkable nitrile rubber composition of the present invention has a Mooney viscosity ($MI_{1+4}$, 100° C.) (compound Mooney) of preferably 15 to 150, more preferably 50 to 120. The cross-linkable nitrile rubber composition of the present invention is superior in moldability by having the above compound Mooney.

Cross-linked Rubber

The cross-linked rubber of the present invention is obtained by cross-linking the cross-linkable nitrile rubber composition.

To cross-link the cross-linkable nitrile rubber composition of the present invention to obtain cross-linked rubber, the composition is molded by a molding machine appropriate for the desired shaped such as an extruder, injection molding machine, press, rolls, etc. and fixed in shape as a cross-linked product by a cross-linking reaction. It may be molded in advance, then cross-linked or, molded and cross-linked simultaneously. The molding temperature is, usually, 10 to 200° C., preferably 25 to 120° C. The cross-linking temperature is, usually, 100 to 200° C., preferably 130 to 190° C., while the cross-linking time is, usually, 1 minute to 24 hours, preferably 2 minutes to 1 hour.

Further, depending on the shape, size, etc. of the cross-linked rubber, sometimes even if the surface is cross-linked, the inside may not be sufficiently cross-linked, so further heating may be applied for secondary cross-linking.

The cross-linked rubber of the present invention has, in addition to the properties of a highly saturated nitrile rubber superior in oil resistance and ozone resistance, a good heat resistance and small compression set. For this reason, the cross-linked rubber of the present invention may be used for O-rings, packings, diaphragms, oil seals, shaft seals, bearing seals, wellhead seals, air compressor seals, seals for sealing the chlorofluorocarbon or fluorohydrocarbons or carbon dioxide used for cooling apparatuses of air-conditioners or compressors for cooling machines for air-conditioning systems, seals for sealing supercritical carbon dioxide or sub-critical carbon dioxide used for washing media for precision washing, seals for roller devices (roller bearings, automobile hub units, automobile water pumps, linear guide devices, balls and screws, etc.), valves and valve seats, BOP (Blow Out Preventers), platters, and other various types of seal materials; intake manifold gaskets attached at connecting part of intake manifold and cylinder head, cylinder head gaskets attached at connecting part of cylinder block and cylinder head, rocker cover gaskets attached at connecting part of rocker cover and cylinder head, oil pan gaskets attached at connecting part of oil pan and cylinder block or transmission case, fuel cell separator gaskets attached between a pair of housings sandwiching a unit cell provided with an anode, electrolyte plates, and cathode, top cover gaskets of hard disk drive, and other various types of gaskets; printing rolls, iron-making rolls, papermaking rolls, industrial use rolls, office machinery rolls, and other various types of rolls; flat belts (film core flat belts, cord flat belts, multilayer flat belts, single piece flat belts, etc.), V-belts (wrapped V-belts, low edge V-belts, etc.), V-ribbed belts (single V-ribbed belts, double V-ribbed belts, wrapped V-ribbed belts, back surface rubber V-ribbed belts, top cog V-ribbed belts, etc.), CVT belts, timing belts, toothed belts, conveyor belts, and other various types of belts; fuel hoses, turbo air hoses, oil hoses, radiator hoses, heater hoses, water hoses, vacuum brake hoses, control hoses, air-conditioner hoses, brake hoses, power steering hoses, air hoses, marine hoses, risers, flowlines, and other various types of hoses; CVJ boots, propeller shaft boots, constant velocity joint boots, rack and pinion boots, and other various types of boots; cushion materials, dynamic dampers, rubber couplings, air springs, vibration isolators, and other damping material rubber parts; dust covers, car interior members, tires, covered cables, shoe soles, electromagnetic wave shields, flexible printed circuit board binders and other binders, fuel cell separators, and other broad applications in the fields of cosmetics and pharmaceuticals, fields coming into contact with food, the electronics field, etc. Among these, it can be particularly preferably used as belts and seal materials.

EXAMPLES

Below, production examples, invention examples, and comparative examples will be given to explain the present invention in more detail. However, the present invention is not limited to these examples. In the following formulations, the "parts" and "%" are based on weight unless otherwise specially indicated. The tests and evaluations were performed as follows.

(1) Carboxyl Group Content

The content of carboxyl group in the rubber was found using a 0.02N hydrous ethanol solution of potassium hydroxide by titration at room temperature using thymol phthalein as an indicator as the number of moles of the carboxyl group with respect to 100 g of the rubber. The unit was ephr.

(2) Mooney Viscosity (Polymer Mooney, Compound Mooney)

Measured according to JIS K6300-1. Unit: ($ML_{1+4}$, 100° C.).

(3) Normal Physical Properties (Tensile Strength, Hardness, and Elongation)

A cross-linkable nitrile rubber composition was placed in a length 15 cm, width 15 cm, depth 0.2 cm mold and press formed, while pressing by a press pressure of 10 MPa, at 170° C. for 20 minutes to obtain a sheet-shaped cross-linked product. This was transferred to a gear type oven where it was secondarily cross-linked at 170° C. for 4 hours. The obtained sheet-shaped cross-linked product was punched by a No. 3 dumbbell cutter to prepare a test piece. This test piece was used in accordance with JIS K6251 for measurement of the tensile strength, hardness, and elongation of the cross-linked rubber.

(4) O-Ring Compression Set

An inside diameter 30 mm, ring diameter 3 mm mold was used to cross-link a cross-linkable nitrile rubber composition at 170° C. for 20 minutes by press pressure of 10 MPa, then secondary cross-linking was performed at 170° C. for 4 hours to obtain an O-ring test piece. The compression set was measured using this O-ring test piece held in a 25% compressed state at 150° C. for 500 hours in accordance with JIS K6262.

(5) Heat Aging Test (Elongation and Change Rate in Elongation)

Test pieces prepared by primary and secondary cross-linking in the same way as the above (3) were measured in accordance with JIS K6257 (Normal Oven Method) for elongation after 500 hours at 150° C. The change rate of the elongation due to the heat aging was found.

Production Example 1

A metal bottle was charged with ion exchanged water in 180 parts, concentration 10 wt % of sodium dodecyl benzenesulfonate aqueous solution in 25 parts, acrylonitrile in 37 parts, mono-n-butyl maleate in 6 parts, and t-dodecylmercaptan (molecular weight adjuster) in 0.75 part in that order, the inside gas was replaced with nitrogen three times, then 1,3-butadiene in 57 parts was charged. The metal bottle was held at 5° C., cumen hydroperoxide (polymerization initiator) in 0.1 part was charged, then a polymerization reaction caused for 16 hours while rotating the metal bottle. A concentration 10 wt % of hydroquinone (polymerization anticatalyst) aqueous solution in 0.1 part was added to stop the polymerization reaction, then a water temperature 60° C. rotary evaporator was used to remove the residual monomer to obtain a latex of an acrylonitrile-butadiene-mono-n-butyl maleate copolymer rubber of acrylonitrile units 34 wt %, butadiene units 60 wt %, and mono-n-butyl maleate units 6 wt % (value measured by $^1$H-NMR analysis) (solids concentration of about 30 wt %).

Further, the latex obtained above was placed in an autoclave, then the autoclave was charged with a palladium catalyst (mixed solution of 1 wt % palladium acetate acetone solution and equal amount by weight of ion exchanged water) to give a content of palladium with respect to the weight of the rubber contained in the latex of 1000 ppm, and the mixture was hydrogenated at a hydrogen pressure of 3 MPa and a temperature of 50° C. for 6 hours to obtain a nitrile-group containing highly saturated copolymer rubber latex. To the obtained nitrile-group containing highly saturated copolymer rubber latex, a two-fold volume of methanol was added to coagulate the nitrile-group containing highly saturated copolymer rubber, then this was vacuum dried at 60° C. for 12 hours to obtain a highly saturated nitrile rubber (a1). The highly saturated nitrile rubber (a1) had an iodine value of 10, a carboxyl group content of $3.2 \times 10^{-2}$ ephr, and a polymer Mooney viscosity ($ML_{1+4}$, 100° C.) of 45. Further, according to $^1$H-NMR analysis, the composition of the highly saturated nitrile rubber (a1) was acrylonitrile units 34 wt %, butadiene units 60 wt % (including hydrogenated parts), and mono-n-butyl maleate units 6 wt %.

Example 1

A Bambury mixer was used to add and mix, into a highly saturated nitrile rubber (a1) of 100 parts, FEF carbon black (product name "Seast SO", made by Tokai Carbon) in 40 parts, a trimellitic acid ester (product name "ADK Cizer C-8", made by ADEKA, plasticizer) in 5 parts, stearic acid (cross-linking accelerator activator) in 1 part, a mixed phosphorus acid ester (product name "Phosphanol RL210", made by Toho Chemical Industry, working aid) in 1 part, 4,4'-di-(α, α'-dimethylbenzyl)diphenylamine (product name "Naugard 445", made by Crompton, antiaging agent) in 1.5 parts, and 2-mercaptobenzimidazole (product name "Nocrac MB", made by Ouchi Shinko Chemical Industry, antiaging agent) in 1.5 parts, then the mixture was transferred to a roll and kneaded with VUCOFAC ACT 55 [made by SAFIC-ALCAN UK: 1,8-diazabicyclo[5,4,0]undecene-7 (DBU) 70% (including part of DBU forming formate), amorphous silica 30%] in 2 parts, and hexamethylene diamine carbamate (product name "Diak#1", made by Dupont Dow Elastomer, polyamine-based cross-linking agent) in 2.6 parts to prepare a cross-linkable nitrile rubber composition.

The obtained cross-linkable nitrile rubber composition was used to test and evaluate the compound Mooney viscosity, normal physical properties, heat aging resistance, and O-ring compression set. The results are shown in Table 1.

Example 2

Except for changing the 2 parts of VUCOFAC ACT 55 (made by SAFIC-ALCAN UK) to 4 parts of RHENOGRAN XLA-60 (GE2014) [made by RheinChemie: DBU 60% (including part of DBU forming zinc dialkyl diphosphate salt), acrylic acid polymer and dispersant 40%], the same procedure was performed as in Example 1 to prepare a cross-linkable nitrile rubber composition. The obtained cross-linkable nitrile rubber composition was used to test and evaluate the compound Mooney viscosity, normal physical properties, heat aging resistance, and O-ring compression set. The results are shown in Table 1.

Example 3

Except for changing the 2 parts of VUCOFAC ACT 55 (made by SAFIC-ALCAN UK) to 1 part of ALCANPOUDRE DBU 70-3KG (GE-2014) (made by SAFIC-ALCAN UK: DBU 70%, filler 30%), the same procedure was performed as in Example 1 to prepare a cross-linkable nitrile rubber composition. The obtained cross-linkable nitrile rubber composition was used to test and evaluate the compound Mooney viscosity, normal physical properties, heat aging resistance, and O-ring compression set. The results are shown in Table 1.

Comparative Example 1

Except for changing the 2 parts of VUCOFAC ACT 55 (made by SAFIC-ALCAN UK) to 2 parts of 1,3-di-o-tolyl guanidine (product name "Noccelar DT", made by Ouchi Shinko Chemical Industry, cross-linking accelerator), the same procedure was performed as in Example 1 to prepare a cross-linkable nitrile rubber composition. The obtained cross-linkable nitrile rubber composition was tested and evaluated in the same way as in Example 1. The results are shown in Table 1.

Comparative Example 2

Except for changing the 2 parts of VUCOFAC ACT 55 (made by SAFIC-ALCAN UK) to 2 parts of 1,3-diphenyl guanidine (product name "Noccelar D", made by Ouchi Shinko Chemical Industry, cross-linking accelerator), the same procedure was performed as in Example 1 to prepare a cross-linkable nitrile rubber composition. The obtained cross-linkable nitrile rubber composition was tested and evaluated in the same way as in Example 1. The results are shown in Table 1.

TABLE 1

|  |  | Example | | | Comp. ex. | |
| --- | --- | --- | --- | --- | --- | --- |
|  |  | 1 | 2 | 3 | 1 | 2 |
| Compound Mooney viscosity [$ML_{1+4}(100°$ C.)] | | 92 | 90 | 96 | 86 | 86 |
| Normal physical properties | Tensile strength (MPa) | 21.4 | 20.6 | 21.2 | 22.2 | 21.4 |
| | Elongation (%) | 230 | 220 | 220 | 230 | 390 |
| | Hardness (Duro A) | 71 | 70 | 71 | 70 | 71 |
| Heat aging test | Change rate in elongation (%) | −30 | −36 | −32 | −35 | −33 |
| O-ring compression set (%) | | 68 | 65 | 64 | 76 | 82 |

As shown in Table 1, the cross-linkable nitrile rubber compositions of the invention examples were good in heat resistance (heat aging test) and small in compression set, these were excellent. As opposed to this, in Comparative Examples 1 and 2 which did not contain the cyclic amidine and/or cyclic amidinium salt (c) expressed in the above formula (1) and therefore did not satisfy the requirements of the present invention, the heat resistance (heat aging test) was good, but the O-ring compression set was inferior.

The invention claimed is:

1. A cross-linkable nitrile rubber composition containing a highly saturated nitrile rubber (a) having an α,β-ethylenically unsaturated nitrile monomer unit and a carboxyl-group containing monomer unit and having an iodine value of 120 or less, a polyamine-based cross-linking agent (d), and a cyclic amidine and/or cyclic amidinium salt (c) of the following formula (1):

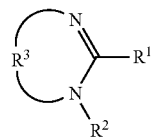

Formula (1)

wherein $R^1$ and $R^2$ independently indicate a hydrogen atom, an alkoxy group, an alkyl group which may have a substituent, alkenyl group which may have a substituent, or aryl group which may have a substituent, $R^1$ and $R^2$ may bond to form a cyclic structure, and, further, $R^3$ indicates an alkylene group or alkenylene group which may have a substituent.

2. The cross-linkable nitrile rubber composition as set forth in claim 1, wherein said carboxyl-group containing monomer unit is an α,β-ethylenically unsaturated dicarboxylic acid monoester monomer unit.

3. The cross-linkable nitrile rubber composition as set forth in claim 1, wherein said cyclic amidine and/or cyclic amidinium salt (c) has a polycyclic structure.

4. The cross-linkable nitrile rubber composition as set forth in claim 1, wherein said cyclic amidine and/or cyclic amidinium salt (c) is 1,8-diazabicyclo[5,4,0]undecene-7 or its salt.

5. The cross-linkable nitrile rubber composition as set forth in claim 1, wherein a ratio of content of said polyamine-based cross-linking agent (d) 0.1 to 20 parts by weight with respect to 100 parts by weight of said highly saturated nitrile rubber (a).

6. The cross-linkable nitrile rubber composition as set forth in claim 1, wherein a ratio of content of said cyclic amidine and/or cyclic amidinium salt (c) is 0.1 to 20 parts by weight with respect to 100 parts by weight of said highly saturated nitrile rubber (a).

7. The cross-linkable nitrile rubber composition as set forth in claim 1, further containing carbon black and/or silica.

8. A cross-linked rubber obtained by cross-linking the cross-linkable nitrile rubber composition as set forth in claim 1.

9. The cross-linked rubber as set forth in claim 8, which is a belt or seal material.

* * * * *